US007415851B2

(12) United States Patent
Lax et al.

(10) Patent No.: US 7,415,851 B2
(45) Date of Patent: Aug. 26, 2008

(54) APPARATUS AND METHODS FOR LOCKING AND UNLOCKING CONTAINERS

(75) Inventors: Michael R. Lax, Syosset, NY (US); Agjah I. Libohova, Bayside, NY (US)

(73) Assignee: Viva Onetime Limited (BS)

( * ) Notice: Subject to any disclaimer, the term of this patent is extended or adjusted under 35 U.S.C. 154(b) by 0 days.

(21) Appl. No.: 11/409,168

(22) Filed: Apr. 21, 2006

(65) Prior Publication Data
US 2006/0254326 A1  Nov. 16, 2006

Related U.S. Application Data

(60) Provisional application No. 60/674,362, filed on Apr. 22, 2005.

(51) Int. Cl.
*E05B 65/00* (2006.01)
*B65D 85/30* (2006.01)
*G08B 23/00* (2006.01)

(52) U.S. Cl. .................. 70/57.1; 206/308.2; 340/572.9

(58) Field of Classification Search ............ 70/57.1, 70/276, 413, 58; 206/1.5, 308.1, 308.2, 387.11; 340/572.9, 568.1; 292/251.5
See application file for complete search history.

(56) References Cited

U.S. PATENT DOCUMENTS

| | | | | | |
|---|---|---|---|---|---|
| 5,956,981 | A | * | 9/1999 | Weisburn et al. ............. | 70/57.1 |
| 5,988,376 | A | * | 11/1999 | Lax ........................... | 206/308.2 |
| 6,467,318 | B1 | * | 10/2002 | Gattiker ...................... | 70/57.1 |
| 2002/0023853 | A1 | | 2/2002 | Lax ............................. | 206/310 |
| 2004/0123311 | A1 | * | 6/2004 | Farrar et al. ................ | 720/728 |
| 2004/0129587 | A1 | * | 7/2004 | Lax et al. .................. | 206/308.2 |
| 2006/0137408 | A1 | * | 6/2006 | Maddox et al. ............. | 70/57.1 |

* cited by examiner

*Primary Examiner*—Patricia Engle
*Assistant Examiner*—Kristina R Fulton
(74) *Attorney, Agent, or Firm*—Ostrolenk, Faber, Gerb & Soffen, LLP

(57) ABSTRACT

Apparatus and methods for locking and unlocking a lockable container that has an internal locking mechanism are disclosed. The apparatus may include a main body including a channel for receiving the container. A magnetic field source coupled to the main body may emit a magnetic field for actuating a container lock catch mechanism disposed at least partially inside the container. The apparatus may include a channel blocker that may be positioned by actuating a channel lock to selectively prevent the magnetic field source from actuating the catch mechanism of a container lock. The channel lock may be coupled to a cam configured to position at least a portion of the channel blocker in the channel. In some embodiments, the apparatus may include a ramp retractor coupled to the channel blocker wherein the ramp retractor urges the channel blocker down through the channel by action of the magnetic field.

11 Claims, 4 Drawing Sheets

APPARATUS AND METHODS FOR LOCKING AND UNLOCKING CONTAINERS

This application claims the benefit of U.S. Provisional Patent Application No. 60/674,362, filed Apr. 22, 2005, which is hereby incorporated by reference herein in its entirety.

BACKGROUND OF THE INVENTION

The invention relates to apparatus and methods for locking and unlocking a lockable container for securing items and, more particularly, for locking and unlocking a lockable container that has an internal locking mechanism.

Currently, there are many containers that can be used to secure storage media such as, for example digital versatile discs ("DVDs"), compact discs ("CDs"), video games, other data storage media, and other consumer products. A typical storage container includes a cover portion and a base portion that is hingedly coupled to the cover portion. An item to be secured is placed in the container, and the cover portion is mated with the base portion to secure the item within the container. The storage containers may, for example, be displayed in a live retail or rental environment, where potential customers can handle and examine the storage container to determine whether to buy or rent the item. It is often desirable to provide a locking means for the storage container to deter potential thieves from stealing the item stored therein.

Currently, various locking approaches exist for use in both the live retail and rental environments. One approach for locking a storage container involves placing on the container an active electronic security tag (e.g., electronic article surveillance ("EAS") tag or a radio frequency identification ("RFID") tag using an edge label. The edge label prevents the container from being easily opened. External security apparatus that wraps around the container may be used instead or in addition to an edge label to secure the container.

The approach described hereinabove, however, has some limitations. For example, external tags and apparatus are easily susceptible to breach because they are exposed. The containers with such tags and apparatus are often locked behind a sales or rental counter for additional security, which denies a consumer the benefit of a "live sale" Consumers often find the edge labels difficult to remove once the container is brought home and ready to be opened. If external security apparatus is wrapped around the containers, the apparatus must either be cut off or removed by the retailer at the point of purchase or by the consumer at home. This external apparatus is then discarded, which is not environmentally friendly, or recycled, which may require the consumption of retail or rental establishment resources.

Accordingly, it would be desirable to provide apparatus and methods for locking and unlocking a lockable container that has an internal locking mechanism.

SUMMARY OF INVENTION

It is an object of the invention to provide apparatus and methods for locking and unlocking a lockable container that has an internal locking mechanism. In accordance with the principles of the invention, apparatus and methods for locking and unlocking a lockable container that has an internal locking mechanism are provided. The container may be configured to secure an item such as a storage medium (e.g, DVDs, CDs, video games, memory cards or other suitable storage media), jewelry, pharmaceutical products, razor blades, printer cartridges, or any other item of value.

The apparatus may include a main body including a channel for receiving the container. The apparatus may include a magnetic field source coupled to the main body emitting a magnetic field for actuating a container lock catch mechanism disposed at least partially inside the container. The apparatus may include at least one magnet arrangement that is configured to lock the container. The apparatus may include at least one magnet arrangement that is configured to unlock the container. The apparatus may include a channel blocker that can be positioned by actuating a channel lock to prevent the magnetic field source from actuating the container lock catch mechanism. The channel lock may be coupled to a cam configured to position at least a portion of the channel blocker in the channel. The apparatus may include a ramp retractor coupled to the channel blocker wherein the ramp retractor urges the channel blocker down through the channel by action of the magnetic field. The apparatus may include a base portion configured to mount the apparatus to a fixture, including but not limited to a check-out counter top.

BRIEF DESCRIPTION OF THE DRAWINGS

The above and other objects and advantages of the invention will be apparent upon consideration of the following detailed description, taken in conjunction with the following drawings, in which the reference characters refer to like parts throughout, and in which.

DETAILED DESCRIPTION OF THE INVENTION

Figure 1:
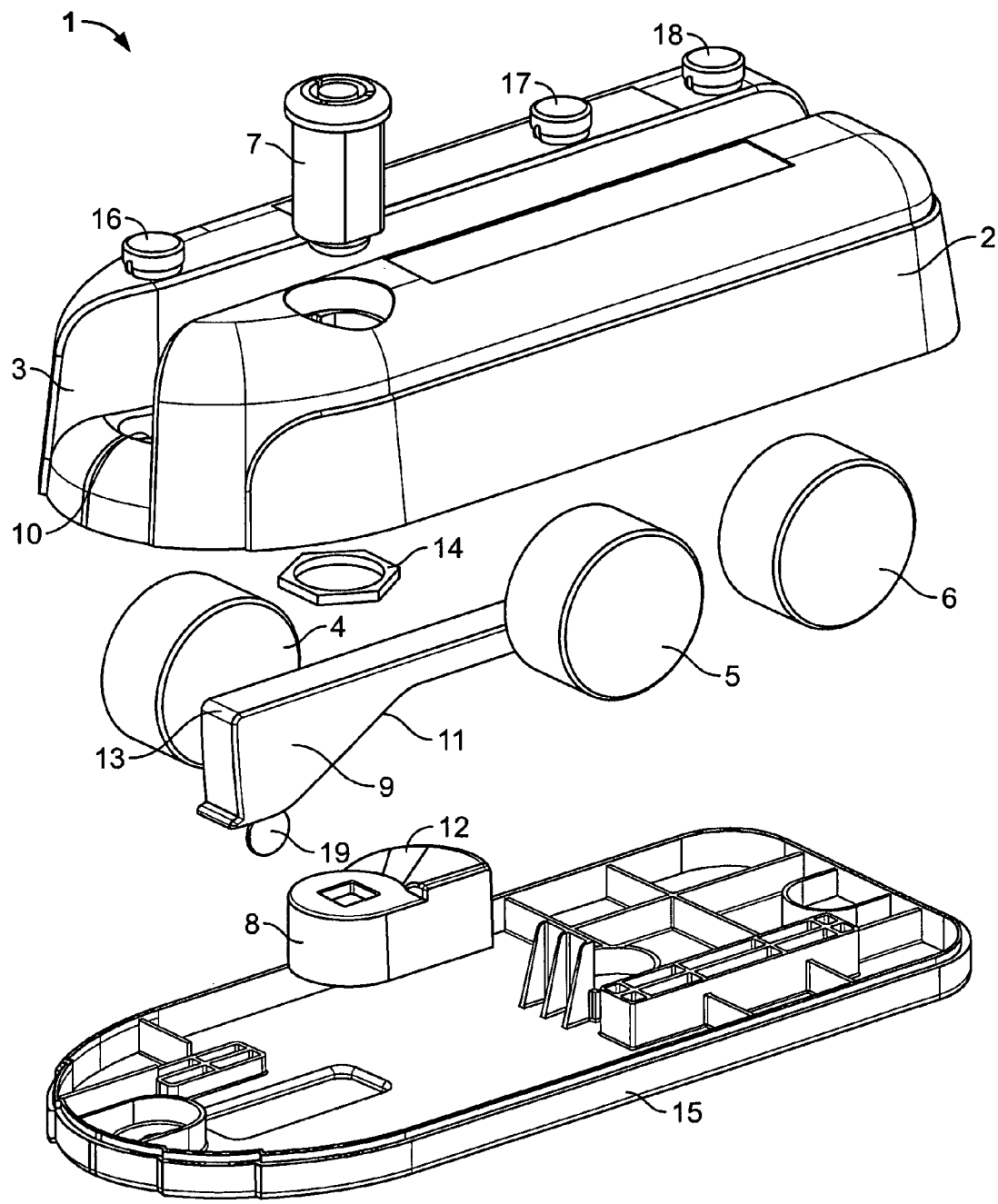
FIG. 1 is an exploded perspective view of an illustrative apparatus in accordance with the principles of the present invention.

In accordance with the principles of the invention, apparatus and methods for locking and unlocking a lockable container that has an internal locking mechanism are provided. The apparatus may include a main body including a channel for receiving the container. Examples of containers that may be locked or unlocked in accordance with the principles of the invention are shown in U.S. Publication Nos. 2002/0023853 and 2004/0129587, which are hereby incorporated herein in their entireties. The apparatus may include a magnetic field source coupled to the main body emitting a magnetic field for actuating a container lock disposed at least partially inside the container. The container lock may include an elongated member that engages hinged portions of the container to lock the container. The elongated member may include, and be secured in place within the container by, a catch mechanism that may be magnetically actuated, and may prevent the elongated member from being removed from the container. Apparatus of the invention may include a channel blocker that may be positioned by actuating a channel lock to selectively prevent the magnetic field source from actuating the catch mechanism of a container lock. The channel lock may be actuated by a cam configured to position at least a portion of the channel blocker in the channel. The apparatus may include a ramp retractor coupled to the channel blocker wherein the ramp retractor urges the channel blocker down through the channel by action of the magnetic field. The apparatus may also include a base portion configured to mount the apparatus to a fixture, including but not limited to a counter top.

Since the container lock catch mechanism is actuated by a magnetic field, the container may be both locked and unlocked, in some embodiments of the invention, without removing any portion of the locking mechanism (e.g., a locking member) from the container.

When locked, the container may be displayed, for example, in a live retail or rental environment. A consumer may handle the container, but may be denied access to its contents by the container lock. Once the consumer decides to purchase, rent or lease the contents of the container, the consumer may bring the container to a checkout counter. At the checkout counter, an employee or other authorized user may unlock the lockable container using the apparatus of the present invention.

To unlock a container, the employee or other authorized user will translate the container through the channel of the apparatus so that the container lock catch mechanism will be actuated by the magnetic field emitted from, on or near the magnetic field sources of the apparatus. The container lock may unlock the container when the container is further translated while the catch mechanism remains in an actuated state. To lock the container, the action is reversed.

Since the apparatus of the invention has a channel lock that can be configured to selectively prevent translation of the container through the channel, an employee or authorized user can lock the apparatus and leave the checkout counter unattended. Without a means to unlock the apparatus, it is difficult for an individual to use the apparatus to unlock, and thus open the container. The apparatus can also be locked after hours or when the store is closed.

FIG. 1 shows an exploded view of illustrative apparatus 1, which may be used for locking and unlocking a lockable container for securing an item. Apparatus 1 includes main body 2, which includes channel 3 for receiving a lockable container.

At least one magnet 4 may be supported by main body 2 to provide a magnetic field source that emits a magnetic field for actuating a container lock (not shown) disposed at least partially within a container (not shown). Main body 2 may include one or more of magnets 5 and 6, possibly in addition to first magnet 4, supported by main body 2. Magnets 4, 5 and 6 may be of different sizes, thereby making the configuration of magnets and magnetic fields more difficult to simulate or duplicate. (It should be noted that the three-magnet arrangement of FIG. 1 is merely illustrative of the various magnetic arrangements that can be utilized to create the magnetic field. The number, size and position of the magnets can vary. For example, apparatus 1 may include 4 magnets of varying sizes, rendering it extremely difficult for a thief to properly manipulate four varying shaped magnets to unlock a container.)

In some embodiments of the invention, one or more of the magnets may be a permanent magnet. In some embodiments of the invention, one or more of the magnets may be an electromagnet. Apparatus 1 may include channel lock 7 that interacts with cam 8 that can move at least a portion of the channel blocker 9 through slot 10 into channel 3. Channel blocker 9 may prevent unauthorized use of the apparatus. To move channel blocker 9 into the locked position, a key (not shown), which may be any suitable key, including a cylindrical key, matched to channel lock 7 is inserted into channel lock 7 and turned to rotate cam 8, which moves channel blocker 9 upward into the "locked position." Graded area 12 of cam 8 pushes on ramped section 11 of channel blocker 9 to move channel blocker 9 upward. In the locked position, channel blocker 9 prevents channel 3 from receiving a container and prevents a container lock catch mechanism from being positioned near the magnetic fields of magnets 4, 5 and 6 and thereby being actuated. Channel blocker 9 may be thus render apparatus 1 temporarily inoperable. Channel blocker 9 may be supported at pivot point 25 (shown in FIG. 6) and may have free end 13 that may be moved into and out of the channel.

To unlock apparatus 1, the key is inserted into apparatus lock 7 and turned in a direction that rotates cam 8 in a manner that lowers channel blocker 9 out of channel 3. Lock nut 14 may be used to keep channel lock 7 from slipping.

A "key-lock counter-mount" feature of some embodiments of the present invention may permit apparatus 1 to be securely coupled to, for example, a retail store checkout counter. Apparatus 1 may have base 15, which may be used to mount apparatus to a fixture such as but not limited to a counter. Fasteners such as but not limited to unidirectional screws may be used to anchor main body 2 to base 15 and the fixture. Plug cover 16, 17, and 18 may be used to cover the fasteners.

For security, any of the known EAS or RFID tags (e.g., an AM or RF non-deactivatable security tag) (not shown) may be mounted on base 13 or coupled to main body 2 of apparatus 1. In such an embodiment, an acoustomagnetic ("AM") or radio frequency ("RF") detector may be placed within a retail store to detect if an unauthorized user attempts to steal apparatus 1 or, for example, if a stolen apparatus is brought into the store. The non-deactivatable tags may set off alarms, notifying security personnel.

In some embodiments, apparatus 1 may include an "identification, serialization, and web server with database" feature. A bar code (not shown), for example, may be placed on main body 2 of apparatus 1. The bar code may include information identifying, for example, one or more of the product number or serial number, the name or ID number of the store or other authorized user, the date the product was sold leased or the like to the authorized user, or any other suitable information. This allows a stolen apparatus to be traced through a database containing serial numbers, manufacturing information and store ID of the apparatus distributed to retailers, replicators, or the like. The stolen apparatus may then be traced back to the last listed authorized user.

Apparatus 1 may also include ramp retractor 19 coupled to channel blocker 9. Ramp retractor 19 may be present to urge channel blocker 9 down through slot 10 in the base of channel 3 and out of channel 3 by engaging with a magnetic field. Ramp retractor 19 may be a magnet. Ramp retractor 19 may be a metal component. Ramp retractor 19 may be configured to be forced downward and thus urge channel blocker 9 down through slot 10. Ramp retractor 19 may be configured to be repelled by one or more magnets. Ramp retractor 19 may be configured to be attracted by two or more magnets. Ramp retractor 19 may be both repelled and attracted by one or more magnets. Repelling and attracting magnets, which may include one or more of magnets 4, 5, and 6 may be supported by main body 2 and base 15.

Figure 2:
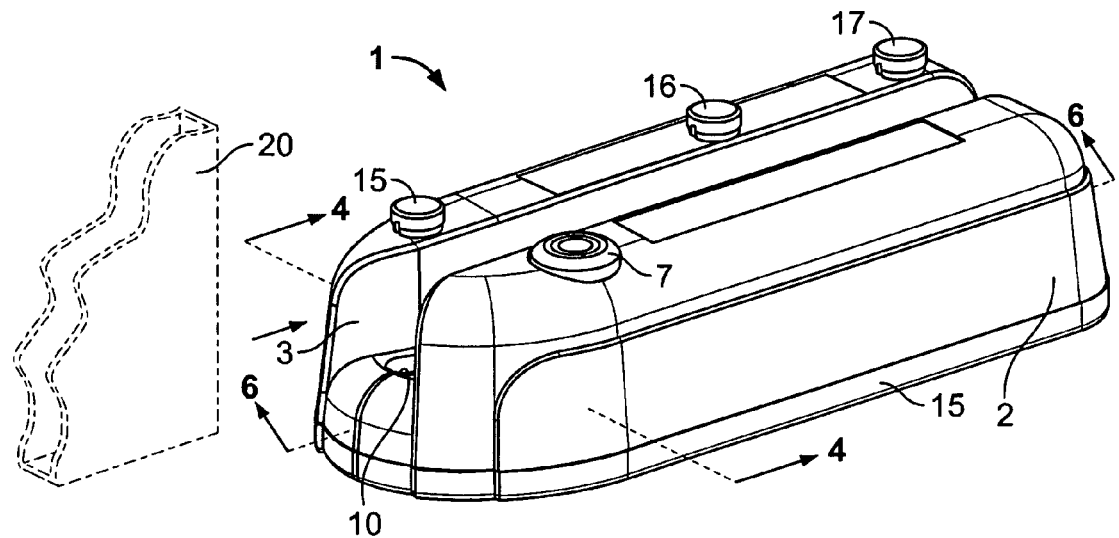
FIG. 2 is a perspective view of the apparatus shown in FIG. 1 along with a container in a first position.

FIG. 2 shows a perspective view of main body 2 of apparatus 1 in accordance with the present invention. Illustrative container 20 is shown entering channel 3 of main body 2. Channel lock 7 and cam 8 (not shown) are configured so that channel blocker 9 is positioned outside of the channel.

Figure 3:
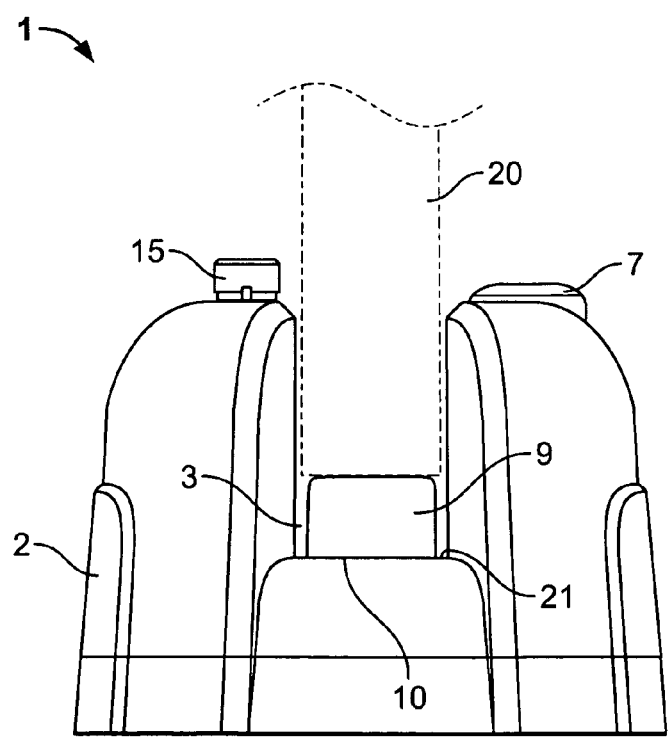
FIG. 3 is a front view of the apparatus shown in FIG. 1.

FIG. 3 shows a front view of apparatus 1. A portion of channel blocker 9 is present in channel 3. Container 20 is displaced from bottom 21 of channel 3, in a position in which magnets 4, 5, and 6 can not actuate the container lock catch mechanism in container 20.

Figure 4:
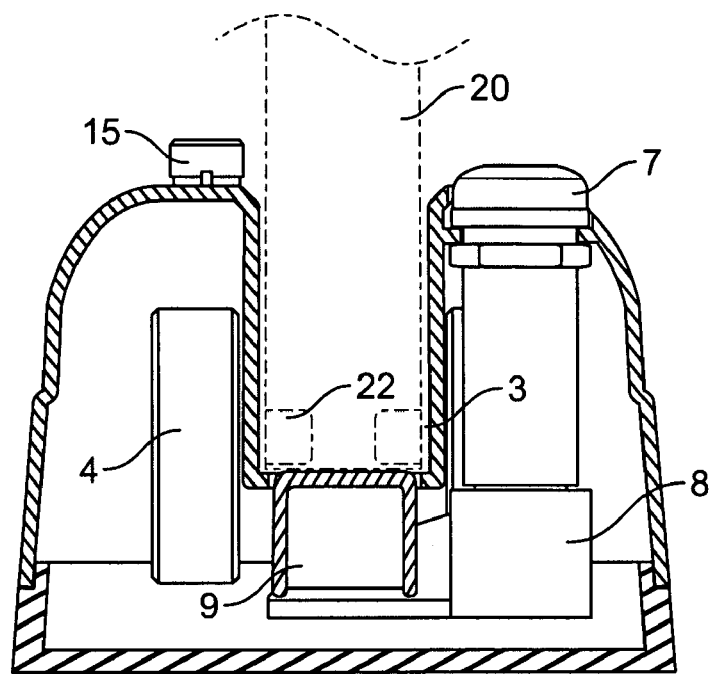
FIG. 4 is a cross-sectional view taken along the line 4-4, shown in FIG. 2, of the apparatus shown in FIG. 2, when the apparatus is in a first state.

FIG. 4 shows a partial cross-sectional view of apparatus 1. Channel lock 7 is shown coupled to cam 8 and is configured in an unlocked position so that channel blocker 9 is positioned outside of channel 3. Container 20 thus can be positioned against bottom 21 of channel 3 so that magnetically reactive catch mechanism 22 of the container lock is aligned with magnets such as magnet 4. In this position the magnetic field of the magnets can actuate the container lock catch mechanism.

Figure 5:
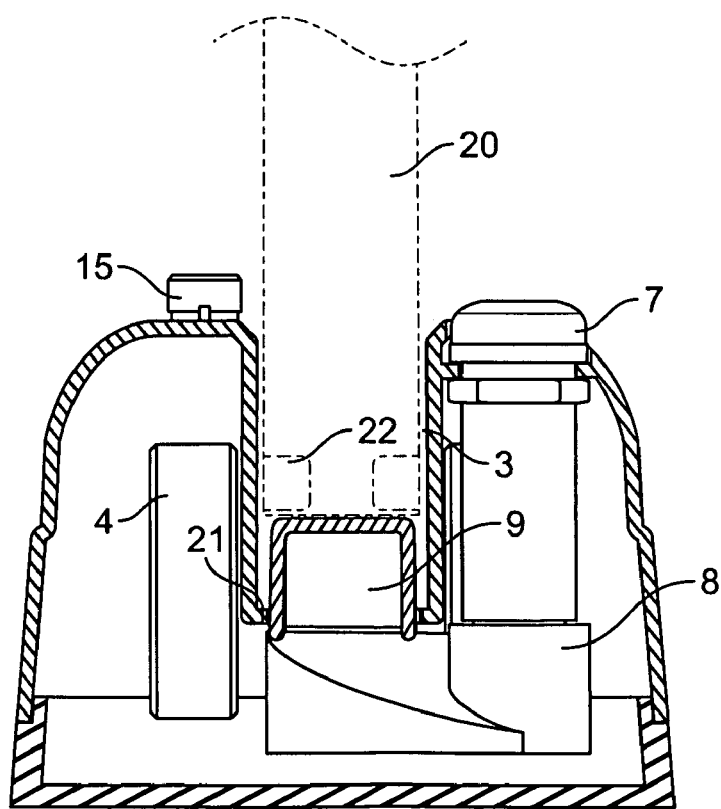
FIG. 5 shows the view shown in FIG. 4 when the apparatus is in a second state.

FIG. 5 shows a partial cross-sectional view of apparatus 1. Channel lock 7 is shown coupled to cam 8 and is configured in a locked position so that channel blocker 9 is positioned at least partially inside channel 3. Channel blocker 9 thus prevents magnetically reactive catch mechanism 22 of the container lock of container 20 from being placed sufficiently close to the magnetic field created by the magnets to actuate catch mechanism 22.

Figure 6:
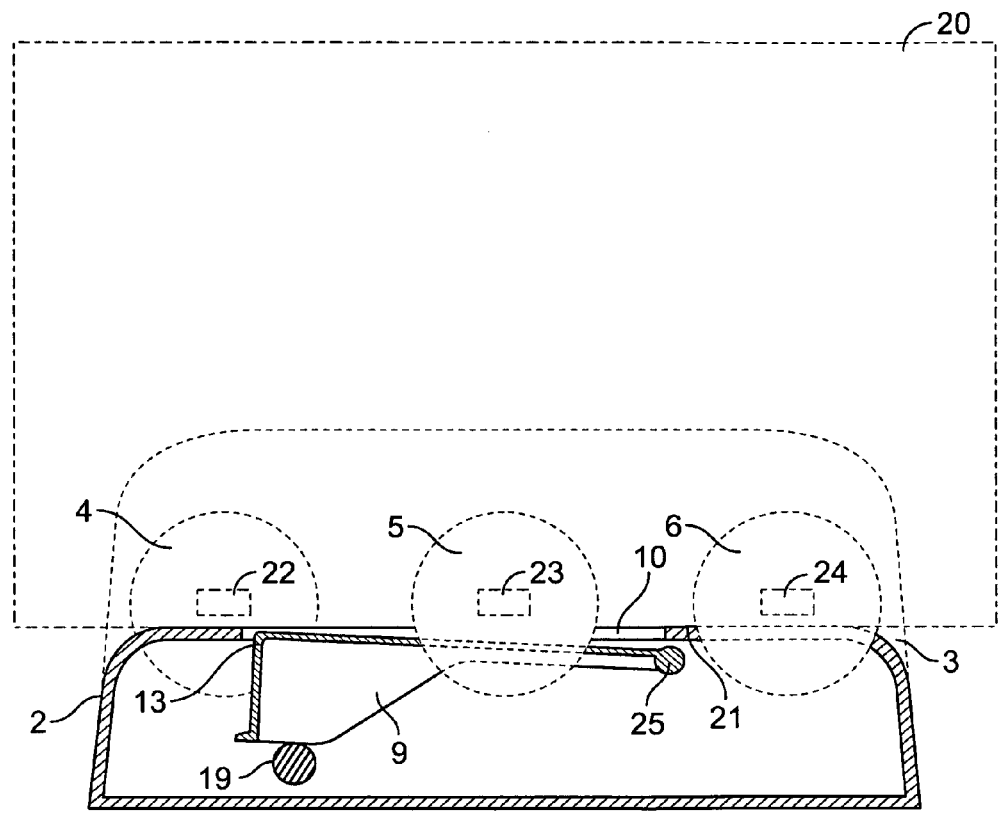
FIG. 6 is in part a cross-sectional view taken along the line 6-6, shown in FIG. 2, when the apparatus is in the first state, and in part a side view of associated portions of the apparatus showing the container in a second position.

FIG. 6 shows container 20 in channel 3, in contact with bottom 21 of channel 3 of main body 2. Apparatus 1 is in an unlocked position, in which channel blocker 9 is outside of channel 3. This allows catch mechanisms 22, 23, and 24 to align with, and be actuated by, magnets 4, 5, and 6, respectively. In connection with some container locks, magnets 4, 5, and 6 may actuate catch mechanisms such as 22, 23, and 24 and may hold catch mechanisms 22, 23, and 24, and all of the container lock, in place during further translation of container 20. This displaces the container lock with respect to container 20. When further translation causes the release of catch mechanisms 22, 23, and 24 from the magnetic fields, the container lock will have been moved from a position in which container 20 is locked to one in which it is unlocked (or vise-versa). Channel blocker 9 may be supported at pivot point 25 and may have free end 13 that may be moved into and out of the channel 3.

It will be understood that the foregoing is only illustrative of the principles of the invention, and that still other modifications can be made by those skilled in the art without departing from the scope and spirit of the invention.

What is claimed:

1. An apparatus for actuating a container lock located at least partially inside a container, the apparatus comprising:
   a main body including a channel for receiving the container;
   a magnetic field source positioned within the main body, the magnetic field source operable to emit a magnetic field for actuating the container lock when the container is received in the channel at a first container receiving position;
   a channel blocker configured and positioned to be removably set to a blocking position, the channel blocker configured to at least partially block in the blocking position at least a portion of the channel and thereby to prevent the channel from receiving the container at the first container receiving position; and
   a cam configured to move at least a portion of the channel blocker to the blocking position by engaging an underside of the channel blocker; and
   an apparatus lock coupled to the cam, the cam being positioned and configured to receive the apparatus lock inserted vertically from a top surface of the main body.

2. The apparatus of claim 1, wherein the apparatus is operable to unlock the container when the container is received in the channel.

3. The apparatus of claim 1, wherein the channel blocker is configured to prevent operation of the magnetic field source to actuate the container lock, when the channel blocker is in the blocking position.

4. The apparatus of claim 1, further comprising a base configured to mount the apparatus to a counter top.

5. The apparatus of claim 1, wherein the main body is coupled to a base by at least one screw which mounts the apparatus to a counter top.

6. The apparatus of claim 1, wherein the cam is operable to contact a ramp on the channel blocker such that when the cam is rotated the cam pushes at least a portion of the channel blocker to the blocking position.

7. An apparatus for actuating a container lock located at least partially inside a container, the apparatus comprising:
   a main body including a channel for receiving the container;
   a magnetic field source positioned within the main body, the magnetic field source operable to emit a magnetic field for actuating the container lock when the container is received in the channel at a first container receiving position;
   a channel blocker configured to be removably positioned to a blocking position, the channel blocker configured to at least partially block in the blocking position at least a portion of the channel and thereby prevent the channel from receiving the container in the first container receiving position;
   an apparatus lock coupled to a cam configured to move at least a portion of the channel blocker to the blocking position; and
   a ramp retractor coupled to the channel blocker, the ramp retractor operable to urge the channel blocker down from the blocking position through the channel by engaging with the magnetic field.

8. The apparatus of claim 7, wherein the ramp retractor comprises metal.

9. The apparatus of claim 7, wherein the ramp retractor comprises a magnet.

10. The apparatus of claim 7, wherein the cam is positioned and configured to receive the apparatus lock inserted vertically from a top surface of the main body.

11. An apparatus for actuating a container lock located at least partially inside a container, the apparatus comprising:
    a main body including a channel for receiving the container;
    a magnetic field source positioned within the main body, the magnetic field source operable to emit a magnetic field for actuating the container lock when the container is received in the channel at a first container receiving position;
    a channel blocker configured and positioned to be removably set to a blocking position, the channel blocker configured to at least partially block in the blocking position at least a portion of the channel and thereby to prevent the channel from receiving the container at the first container receiving position;
    a cam configured to move at least a portion of the channel blocker to the blocking position by engaging an underside of the channel blocker; and
    an apparatus lock coupled to the cam, the cam positioned and configured to contact a ramp of the channel blocker such that when the cam is rotated the cam pushes at least a portion of the channel blocker to the blocking position.

* * * * *